United States Patent
Chang et al.

(10) Patent No.: US 11,516,133 B2
(45) Date of Patent: Nov. 29, 2022

(54) FLOW CACHE MANAGEMENT

(71) Applicant: Nokia Solutions and Networks OY, Espoo (FI)

(72) Inventors: Hyunseok Chang, Holmdel, NJ (US); Fang Hao, Morganville, NJ (US); Muralidharan Kodialam, Marlboro, NJ (US); T. V. Lakshman, Morganville, NJ (US); Sarit Mukherjee, Morganville, NJ (US); Limin Wang, Plainsboro, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/920,993

(22) Filed: Jul. 6, 2020

(65) Prior Publication Data
US 2022/0006737 A1   Jan. 6, 2022

(51) Int. Cl.
*H04L 12/747* (2013.01)
*H04L 12/721* (2013.01)
(Continued)

(52) U.S. Cl.
CPC ........ *H04L 45/742* (2013.01); *G06F 12/0802* (2013.01); *H04L 45/38* (2013.01);
(Continued)

(58) Field of Classification Search
CPC ... H04L 45/742; H04L 45/38; H04L 45/7453; H04L 49/70; G06F 12/0802;
(Continued)

(56) References Cited

U.S. PATENT DOCUMENTS 6,047,357 A * 4/2000 Bannon ............... G06F 12/0811
711/143
7,289,442 B1 * 10/2007 Srinivasan .......... H04L 41/0896
370/230
(Continued)

OTHER PUBLICATIONS

Estan, Cristian et al. "New Directions in Traffic Measurement and Accounting" SIGCOMM Computer Communication Review (Oct. 2002): 323-336.
(Continued)

*Primary Examiner* — Derrick V Rose
(74) *Attorney, Agent, or Firm* — Mendelsohn Dunleavy, P.C.; Steve Mendelsohn; Yuri Gruzdkov

(57) ABSTRACT

Packet-processing circuitry including one or more flow caches whose contents are managed using a cache-entry replacement policy that is implemented based on one or more updatable counters maintained for each of the cache entries. In an example embodiment, the implemented policy enables the flow cache to effectively catch and keep elephant flows by giving to the caught elephant flows appropriate preference in terms of the cache dwell time, which can beneficially improve the overall cache-hit ratio and/or packet-processing throughput. Some embodiments can be used to implement an Open Virtual Switch (OVS). Some embodiments are advantageously capable of implementing the cache-entry replacement policy with very limited additional memory allocation.

26 Claims, 6 Drawing Sheets

(51) Int. Cl.
| | |
|---|---|
| *G06F 12/0802* | (2016.01) |
| *H04L 12/743* | (2013.01) |
| *H04L 12/931* | (2013.01) |
| *H04L 45/74* | (2022.01) |
| *H04L 45/7453* | (2022.01) |
| *H04L 49/00* | (2022.01) |
| *H04L 45/00* | (2022.01) |

(52) U.S. Cl.
CPC .......... *H04L 45/7453* (2013.01); *H04L 49/70* (2013.01); *G06F 2212/60* (2013.01)

(58) Field of Classification Search
CPC ............. G06F 2212/60; G06F 12/0864; G06F 12/0895; G06F 16/90344; G06F 16/906; G06F 2212/1024; G06F 2212/154
See application file for complete search history.

(56) References Cited

U.S. PATENT DOCUMENTS

| | | | |
|---|---|---|---|
| 8,931,088 | B2 | 1/2015 | Chen et al. |
| 8,937,865 | B1 * | 1/2015 | Kumar ................... H04L 47/76 370/235 |
| 9,160,650 | B2 | 10/2015 | Zhang et al. |
| 9,185,015 | B2 | 11/2015 | Matthews |
| 9,379,973 | B2 | 6/2016 | Mekkattuparamban et al. |
| 9,477,604 | B2 | 10/2016 | Banavalikar et al. |
| 9,686,200 | B2 | 6/2017 | Pettit et al. |
| 9,762,492 | B2 | 9/2017 | Szabo et al. |
| 9,998,352 | B2 | 6/2018 | Liang et al. |
| 10,110,517 | B2 | 10/2018 | Yu et al. |
| 10,541,918 | B2 | 1/2020 | Singh et al. |
| 2014/0226661 | A1 * | 8/2014 | Mekkattuparamban ..................... H04L 45/74 370/392 |
| 2017/0212864 | A1 | 7/2017 | Leitner |
| 2019/0163630 | A1 * | 5/2019 | Gray ................... G06F 11/3037 |
| 2019/0260676 | A1 * | 8/2019 | Singh ..................... H04L 45/44 |
| 2020/0076928 | A1 * | 3/2020 | Wang .................... H04L 45/742 |
| 2020/0326885 | A1 * | 10/2020 | Wozniak ............... G06F 3/0653 |
| 2021/0124694 | A1 * | 4/2021 | Verplanken ......... G06F 12/0848 |
| 2021/0157725 | A1 * | 5/2021 | Barbalho ............ G06F 12/0802 |
| 2021/0160184 | A1 * | 5/2021 | Katan .................... G06F 12/08 |

OTHER PUBLICATIONS

Estan, Cristian et al. "New Directions in Traffic Measurement and Accounting: Focusing on the Elephants, Ignoring the Mice." ACM Transactions on Computer Systems 21.3 (2003): 270-313.

Cache replacement policies, www.wikipedia.org, 2004 [retrieved on May 26, 2020] Retrieved from the Internet: <URL: https://en.wikipedia.org/w/index.php?title=Cache_replacement_policies&oldid=956106778> (9 pages).

Hao, Fang et al., "Fast, Memory Efficient Flow Rate Estimation Using Runs" IEEE/ACM Tranactions on Networking 15.6 (Dec. 2007): 1467-1477.

Gong, Junzhi et al., "HeavyKeeper: An Accurate Algorithm for Finding Top-k Elephant Flows." Proceedings of the 2018 USENIX Annual Technical Conference, Boston, MA (Jul. 2018): 909-921.

Sivaraman, Vibhaalakshmi et al. "Heavy-Hitter Detection Entirely in the Data Plane" Proceedings of the Symposium on SDN Research, SOSR 2017, Association for Computing Machinery, Inc, (2017): 164-176.

OvS-DPDK Datapath Classifier, www.intel.com, 2016 [retrieved on May 29, 2020] Retrieved from the Internet: <URL: https://software.intel.com/content/www/us/en/develop/articles/ovs-dpdk-datapath-classifier.html> (13 pages).

OvS-DPDK Datapath Classifier—Part 2, www.intel.com, 2016 [retrieved on May 29, 2020] Retrieved from the Internet: <URL: https://software.intel.com/content/www/us/en/develop/articles/ovs-dpdk-datapath-classifier-part-2.html> (19 pages).

* cited by examiner

400

| | |
|---|---|
| 410: | • If there is a cache miss for cache line $j$, then |
| 412: |     − If $C_j \neq 0$, then $C_j \leftarrow C_j - 1$; |
| 414: |     − If $C_j = 0$, then replace current cache content with new flow and Set $C_j \leftarrow c$; |
| 420: | • If there is a cache hit at cache line $j$, then $C_j \leftarrow C_j + d$ |

```
601  if (ARR == CACHE) then
602      GAP ← 0      SC ← min{SC + d, 4096}
603  else
604      GAP ← GAP + 1
605      if (SC ≥ 4d and GAP ≥ 4d) then
606          SC ← 1      d ← 1     CACHE ← ARR
607      else
608          SC ← SC - 1
609          if (SC == 0) then
610              SC ← 1      ZC ← ZC + 1
611              if (RANDOM < 0.01) then
612                  CACHE ← ARR
613              end if
614              if (ZC == 8) then
615                  ZC ← 0   d ← min{d + 1, 256}
616              end if
617          end if
618      end if
619  end if
```

FIG. 7

| BIG : SMALL (VOLUME RATIO) | CONVENTIONAL OVS | | WITH CIRCUIT 300 | | IMPROVEMENT | |
|---|---|---|---|---|---|---|
| | THROUGHPUT (Mpps) | SMC hit | THROUGHPUT (Mpps) | SMC hit | THROUGHPUT ↑ | Hit ↑ |
| 1 : 1 | 2.42 | 0.41 | 3.06 | 0.66 | 26% | 61% |
| 4 : 1 | 2.78 | 0.56 | 3.74 | 0.81 | 35% | 45% |
| 8 : 1 | 3.27 | 0.70 | 4.07 | 0.87 | 24% | 11% |

FLOW CACHE MANAGEMENT

BACKGROUND

Field

Various example embodiments relate to communication equipment and, more specifically but not exclusively, to packet-traffic monitoring and routing.

Description of the Related Art

This section introduces aspects that may help facilitate a better understanding of the disclosure. Accordingly, the statements of this section are to be read in this light and are not to be understood as admissions about what is in the prior art or what is not in the prior art.

A cache can be used to store a copy of frequently accessed data in a faster memory, thereby speeding up data access and possibly the overall data processing. Multiple caches may be used to speed up both data and instruction retrieval.

A network-traffic flow is a stream of data packets that share certain common characteristics, e.g., the source and destination addresses. Network-traffic flows typically need to be monitored and/or managed, e.g., for more-efficient allocation of resources and/or to meet quality-of-service (QoS) specifications. For example, a flow cache may be used to access frequently used packet processing rules or instructions. Some flow caches may be implemented using tables configured to map a packet header onto an "action," e.g., a processing rule or instruction to be applied to the corresponding packet.

SUMMARY OF SOME SPECIFIC EMBODIMENTS

Disclosed herein are various embodiments of packet-processing circuitry including one or more flow caches whose contents are managed using one or more updatable counters maintained for each of the cache entries. In an example embodiment, the updatable counters are used to implement a cache-entry replacement policy that enables the flow cache to effectively catch and keep elephant flows by giving to the caught elephant flows appropriate preference in terms of the cache dwell time, which can beneficially improve the overall cache-hit ratio and/or packet-processing throughput. Some embodiments can be used to implement an Open Virtual Switch (OVS). Some embodiments are advantageously capable of implementing the cache-entry replacement policy with very limited additional memory allocation.

According to an example embodiment, provided is an apparatus comprising a network device that comprises packet-processing circuitry configured to apply sets of flow-specific actions to received packets based on identification of a respective flow for each of the received packets; wherein the packet-processing circuitry comprises a first flow cache and an electronic cache controller, the first flow cache being configured to aid in the identification by storing therein a plurality of entries, each of the entries pointing to a respective one of the sets, the electronic cache controller being configured to replace at least some of the entries based on corresponding first updatable counters; and wherein, in response to a cache hit, the packet-processing circuitry is configured to increment the first updatable counter corresponding to a hit entry.

According to another example embodiment, provided is an apparatus comprising: at least one processor; and at least one memory including program code; and wherein the at least one memory and the program code are configured to, with the at least one processor, cause the apparatus at least to: apply sets of flow-specific actions to received packets based on identification of a respective flow for each of the received packets; perform said identification using a flow cache configured to store therein a plurality of entries, each of the entries pointing to a respective one of the sets; replace at least some of the entries based on corresponding updatable counters; and in response to a cache hit, increment the updatable counter corresponding to a hit entry.

According to yet another example embodiment, provided is a non-transitory machine-readable medium, having encoded thereon program code, wherein, when the program code is executed by a machine, the machine implements a method comprising the steps of: (A) applying sets of flow-specific actions to received packets based on identification of a respective flow for each of the received packets; (B) performing said identification using a flow cache configured to store therein a plurality of entries, each of the entries pointing to a respective one of the sets; (C) replacing at least some of the entries based on corresponding updatable counters; and (D) in response to a cache hit, incrementing the updatable counter corresponding to a hit entry.

BRIEF DESCRIPTION OF THE DRAWINGS

Other aspects, features, and benefits of various disclosed embodiments will become more fully apparent, by way of example, from the following detailed description and the accompanying drawings, in which:

FIG. 6 shows a script that can be used to program the digital circuit of FIG. 3 according to another embodiment; and FIG. 7 illustrates example performance improvements for the network device of FIG. 1 according to an embodiment.

DETAILED DESCRIPTION

Figure 1:
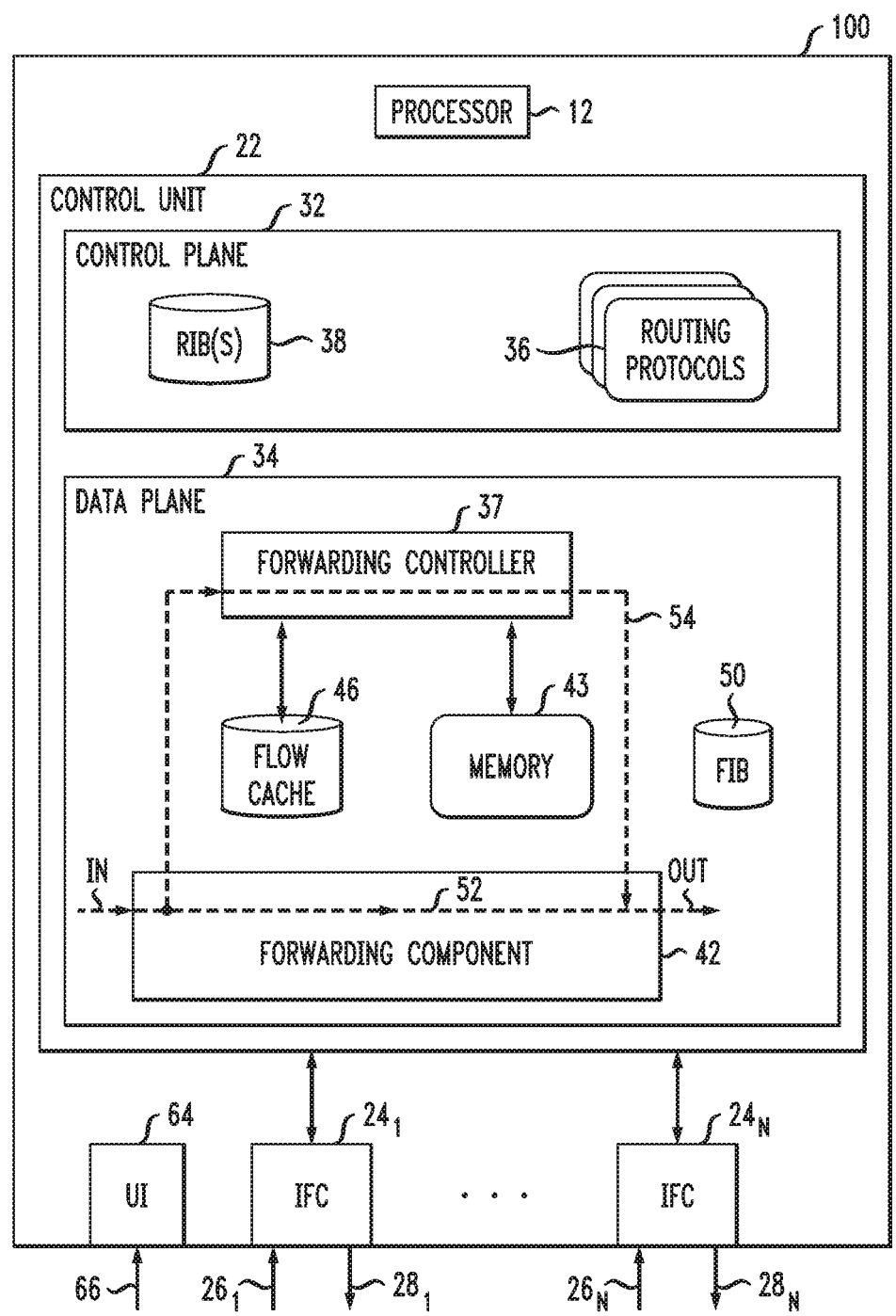
FIG. 1 shows a block diagram of a network device using which at least some embodiments may be practiced.

Typically, a cache is designed to hold a small portion of the relevant data. As a result, it is important to have a good strategy for selecting the pieces of data to be stored in the cache, e.g., to maximize the cache-hit ratio.

In some cases, a flow cache can be implemented based on a flow hash table. A flow hash table uses hash values as indices that point to actions to be applied to the packets. When a packet arrives, the corresponding hash value is calculated based on one or more header fields of the packet and then is used to look up the corresponding action. If the flow hash table has the corresponding entry stored therein, then the look up can be very fast, which can significantly reduce the packet-processing latency. Otherwise, additional time is typically needed to look up the applicable action in some other memory.

With some hash functions, several different flows may be mapped onto the same hash value. However, the flow hash table of the cache may only have a single entry for that hash value at any given time. Furthermore, at some times, the flow hash table may not even have the corresponding entry at all, e.g., due to the table entries being dynamically replaced. For example, one possible cache-entry replacement policy may be to overwrite some older entry by the entry corresponding to the most-recent packet. Since cache-entry replacement typically incurs a significant processing overhead, the arriving packets may be used for the corresponding entry insertion/replacement in the flow hash table with a relatively small fixed probability, e.g., ca. 1%.

Under some traffic conditions, flows of different relative sizes may be present. For example, some flows may be relatively small, whereas some other flows may be relatively large, e.g., at least one hundred times larger than the small flows. In some relevant literature, small flows may be referred to as "mice" flows while large flows may be referred to as "elephant" flows.

For illustration purposes, let us consider an example scenario in which one hundred mice flows, each with the normalized packet rate of 0.005, and one elephant flow with the normalized packet rate of 0.5 share the same hash table entry. Under the above-outlined cache-entry replacement policy, the elephant flow will have an entry in the cache with a 50% probability, and the estimated cache-hit ratio for the elephant flow will be 0.25 (=0.5×0.5). Similarly, the estimated cache-hit ratio for all the mice flows combined will be 0.0025 (=0.005×0.005×100). Thus, the overall estimated cache-hit ratio in this example scenario is 0.2525 (=0.25+0.0025). Note that, here, the cache-hit benefit for the mice flows is insignificant compared to that of the elephant flow. Also note that this relatively insignificant benefit is obtained at the cost of significantly and detrimentally reducing the benefit for the elephant flow compared to the possible maximum benefit therefor. As such, the tradeoff realized under this policy is acutely suboptimal. The latter conclusion can be more-clearly illustrated by observing that a simple policy modification, under which the elephant flow has an entry in the cache 100% of the time, increases the overall estimated cache-hit ratio to 0.5 (=0.5×1+0.005×0×100).

The above-described example indicates that a better cache-entry replacement policy can be enacted when elephant flows are present. However, challenges to devising such "better" policy may include one or more of the following:

(1) Efficient identification and tracking of elephant flows for each of the hash table entries;
(2) Designing an elephant-flow detection scheme that can operate with a relatively small memory space, e.g., to enable the corresponding flow cache to fit into the central-processing-unit (CPU) cache;
(3) Flexibility to handle a relatively wide range of elephant-flow rates; and
(4) Applicability to every packet, with as few auxiliary instructions as possible.

At least some of the above-indicated problems in the state of the art can be addressed using at least some embodiments described in this specification. For example, some embodiments provide methods and apparatus for efficiently identifying and tracking elephant flows for each cache entry. The identified elephant flows may then be given appropriate preference in terms of the cache dwell time, which can improve the overall cache-hit ratio for the processed flows, e.g., as indicated by the experimental results described below in reference to FIG. 7.

FIG. 1 shows a block diagram of a network device 100 using which at least some embodiments may be practiced. As shown, network device 100 comprises a processor 12, a control unit 22, interface cards (IFCs) $24_1$-$24_N$, and a user interface (UI) 64, where N is an integer greater than one. Processor 12 may be configured to carry out data processing and/or execute instructions to support proper operation of other components of network device 100.

In an example embodiment, network device 20 may include a chassis or cabinet (not explicitly shown in FIG. 1) having a plurality of slots configured to house certain components of the network device, e.g., implemented in the form of insertable blades or cards, including, for example, the IFCs $24_1$-$24_N$. The chassis typically provides communicable coupling of the inserted blades and/or cards to control unit 22 via a bus, a backplane, and/or other suitable communication mechanism. In operation, the IFCs $24_1$-$24_N$ may receive packets and/or other network traffic via ingress network links $26_1$-$26_N$, respectively, and may send packets and/or other network traffic via egress network links $28_1$-$28_N$, respectively. In some embodiments, a pair of links $26_n$ and $28_n$ (where n=1, . . . , N) may be implemented using a common physical communication medium capable of supporting a full duplex mode of operation. In some embodiments, each of the IFCs $24_1$-$24_N$ may be capable of sending and receiving data signals at the same time.

In an example embodiment, control unit 22 may be partitioned into logical and/or physical planes, each implementing a respective distinct functionality. As illustratively shown in FIG. 1, control unit 22 comprises a control plane 32 and a data or forwarding plane 34. Control unit 22 may further comprise a service plane (not explicitly shown in FIG. 1) and possibly some other logical or physical planes. In some embodiments, some or all of such planes may be implemented using different respective software pieces running on a shared set of hardware components. In some other embodiments, some or all of such planes may be implemented using different respective hardware components (e.g., digital circuits). In yet some other embodiments, some or all of such planes may be implemented using some suitable combination of dynamically programmable and one-time programmable (e.g., static) digital circuits.

In an example embodiment, control plane 32 operates to provide a routing functionality for network device 100. For example, control plane 32 may be configured to implement one or more routing protocols 36, which can be called upon as appropriate or necessary. Routing protocols 36 may include, for example, the Intermediate System to Intermediate System (IS-IS) protocol, the Open Shortest Path First (OSPF) protocol, the Routing Information Protocol (RIP), the Border Gateway Protocol (BGP), and/or other routing protocols. By executing one or more routing protocols 36, control plane 32 can identify existing routes and determine new routes through the corresponding network. Control plane 32 also typically has one or more routing information bases (RIBs) 38 configured to store relevant routing information therein. Such routing information may include, for example, information regarding the topology of the corresponding network. In operation, control plane 32 may use the topology defined by the routing information stored in the RIB(s) 38 to select or determine one or more routes through the network for the packets processed by network device 100.

Control plane 32 may operate to update a forwarding information base (FIB) 50 of data plane 34 in accordance with the routing protocol(s) 36 and information stored in the RIB(s) 38. When forwarding a packet, data plane 34 generally relies on the packet's header and information from the FIB 50 to determine a next hop for the packet. Data plane 34 may then identify a subset of egress network links $28_1$-$28_N$ that the packet may be applied to.

In an example embodiment, data plane 34 further comprises a forwarding controller 37, a forwarding component 42, a memory 43, and a flow cache 46. Forwarding component 42 can be implemented, e.g., using a packet processor, a packet-forwarding engine, or other suitable execution unit that operates to execute actions on the received packets. Forwarding controller 37 operates to determine which action(s) is/are to be applied to a packet by accessing flow cache 46 and, if necessary, memory 43. A dashed arrow 54 schematically indicates a processing path invoked by data plane 34 in the process of retrieving a set of actions applicable to a packet 52 temporarily stored in forwarding component 42. Example processing steps corresponding to processing path 54 are described in more detail below in reference to FIGS. 2 and 3. Forwarding controller 37 further operates to replace and update entries in flow cache 46 using the applicable cache-entry replacement policy and by accessing the relevant information stored in memory 43 or other relevant memory. In some embodiments, flow cache 46 can be a multitier cache, e.g., implemented as described in reference to FIG. 2.

In operation, network device 100 may receive packet 52 through one of ingress network links $26_1$-$26_N$. Forwarding component 42 typically has a buffer in which packet 52 can be temporarily stored. Actions that forwarding component 42 may apply to the stored packet 52 can be selected, e.g., from the following nonexclusive list: (i) forward packet 52 to one or more IFCs 24 for egress through the corresponding one or more links 28; (ii) drop packet 52; (iii) add a tag to packet 52; (iv) send packet 52 to another module within network device 100 e.g., to the connection tracker module, etc.

In some embodiments, forwarding component 42 may implement packet batching. For example, a set of received packets 52 may be sorted in forwarding component 42 into two or more groups based on the flows to which the received packets have been matched by forwarding controller 37. Each group of packets can then be enqueued into a corresponding batch. All packets enqueued into the same batch are processed with a respective set of actions attributed to the matched flow. Some of the sets of actions may consist of a single respective action. Some other sets of actions may include two or more respective actions.

In some embodiments, network device 100 may receive configuration information 66 through UI 64, e.g., from a system administrator. UI 64 can be implemented, e.g., as a command line interface.

In an example embodiment, network device 100 can be implemented using an Open Virtual Switch (also often referred to as Open vSwitch or OVS). As known in the pertinent art, an OVS can be a production quality, multilayer virtual switch. A virtual switch can serve as a full-sized virtual alternative to a physical switch. An OVS can beneficially be configured to operate in different or multiple layers of the Open Systems Interconnection (OSI) model, such as L2 (Data Link Layer), L3 (Network Layer), and/or L4 (Transport Layer). As such, an OVS can be configured to use IP addresses and MAC addresses to process packets. To date, OVS's have been used in multiple products and run in many large production environments. For example, OVS is a popular plug-in used by OpenStack, e.g., for its Neutron networking service.

Example applications of OVS include but are not limited to the following tasks:
(A) Divide an existing network into several virtual local area networks (VLANs), applying individual rules to each of the resulting VLANs;
(B) Create Generic Routing Encapsulation (GRE) and/or virtual extensible local area network (VXLAN) tunnels between different networks;
(C) Bind several physical interfaces into one interface, e.g., to improve performance and fault tolerance;
(D) Create OpenFlow rules to control packet traffic;
(E) Support virtual machine (VM) migration; and
(F) Create a bridge on a VM host for inter-guest communication and guest-outside connections.

Figure 2:
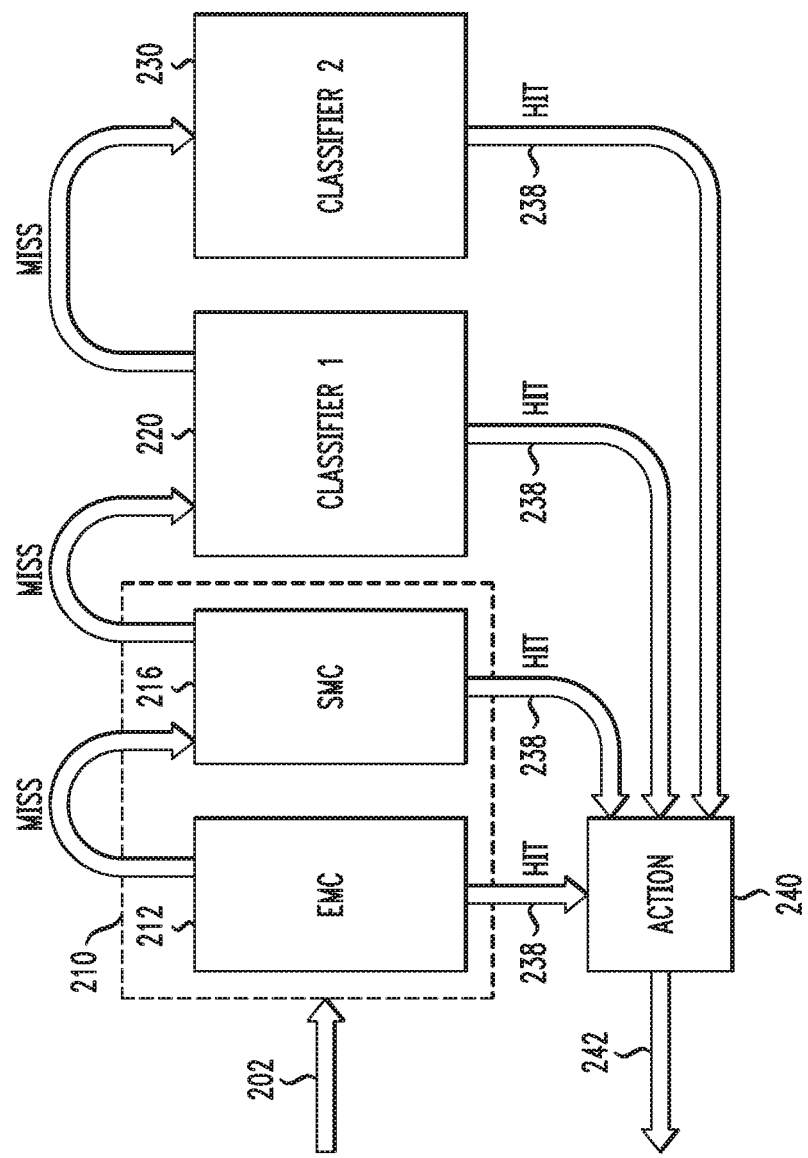
FIG. 2 shows a block diagram of a flow cache that can be used in the network device of FIG. 1 according to an embodiment.

FIG. 2 shows a block diagram of flow cache 46 that can be used in network device 100 according to an embodiment. As shown in FIG. 2, flow cache 46 comprises three tiers of flow caches, which are labeled 210, 220, and 230, respectively. In an alternative embodiment, flow cache 46 may have a different (from three) number of tiers. Cache tier 210 comprises two flow caches, which are labeled 212 and 216, respectively. In some embodiments, one of the caches 212 and 216 may be absent. Each subsequent cache tier has a higher capacity but slower processing time than the preceding cache tier. The same may also be true for the sub-tiers. In an OVS implementation, the cache tiers 210, 220, and 230 may be referred to as the Datapath Flow Cache, Datapath Classifier, and OpenFlow Protocol (ofproto) Classifier, respectively.

In an example embodiment, cache tier 210 can be implemented using one or more hash tables. For example, flow cache 212 can be an exact match cache (EMC), and flow cache 216 can be a signature match cache (SMC). Each of EMC 212 and SMC 216 can be enabled and disabled independently. EMC 212 typically has the shortest lookup time but is designed to handle only several thousand active flows. SMC 216 has a higher capacity, e.g., approximately one million flows, but incurs additional overhead of wildcard-based flow verification for matched flows. Cache tier 220 can be implemented using a plurality of sub-tables configured for a tuple space search (TSS) that supports arbitrary bitwise matching on packet-header fields. As such, cache tier 220 can perform wildcard-based matching. Cache tier 230 can be implemented using an OpenFlow pipeline, which can typically handle priority-based matching and/or relatively sophisticated multi-stage matching. Due to these differences in the processing complexity, each higher cache tier may be several times slower than the immediately adjacent lower cache tier.

A hash table used in flow cache 46 typically stores a data structure that can be used to define and/or identify flows. Parts of such data structure for a flow may include some or all of the following fields: (i) flow key; (ii) flow signature; (iii) rule; (iv) action(s); (v) statistics; (vi) batch (e.g., a pointer to the queue for processing packets matched to the flow); (vii) thread identifier (ID); and (viii) reference count. Different hash values serve as indices to different respective entries in the hash table. In some literature, the terms "flow" and "rule" may be used interchangeably. However, note that the rule is one of the attributes that define the corresponding flow in the data structure. A portion of the packet header common to all packets of the flow may be placed into the flow-key field to enable unambiguous identification of the flow. The flow-key field may be used, e.g., to distinguish a true cache hit from a hash-value collision. When a hash-value collision is detected, the corresponding flow-cache look-up result is a cache miss. A flow signature can be computed from the flow key by applying thereto a transformation that causes the flow signature to have a smaller number of bits than the flow key. As already indicated above, signature-based flow matching requires an additional verification step to rule out signature-value collisions, i.e., situations in which two different flow keys produce the same signature upon the applied transformation.

In operation, flow cache 46 may receive a look-up request 202, e.g., from forwarding controller 37, regarding the action(s) that need to be applied to a packet, e.g., packet 52 temporarily buffered in forwarding component 42 (also see FIG. 1). The look-up request 202 may include a hash value computed using a header of the packet. In response to the look-up request 202, flow cache 46 first operates to look up the corresponding rule in cache tier 210, which may include a lookup in EMC 212 or SMC 216, or in both EMC 212 and SMC 216. If there is no match in cache tier 210, then flow cache 46 operates to look up the corresponding rule in cache tier 220. If there is no match in cache tier 220, then flow cache 46 proceeds to look up the corresponding rule in cache tier 230.

In an example embodiment, various tables and sub-tables used in the cache tiers 210, 220, and 230 may include various {rule, flow pointer} couples. When a matching rule is found in one of the tables or sub-tables, i.e., when a cache hit occurs, a corresponding flow pointer 238 is used by an action retrieval module 240 to fetch the corresponding action set from the pointed-to memory address. Module 240 then sends a response 242 that communicates said action set to forwarding controller 37, which then appropriately configures forwarding component 42 for the execution of the action(s). In an example embodiment, module 240 can be a part of processing path 54 (FIG. 1).

The following part of this specification describes example embodiments of an efficient mechanism capable of identifying and tracking elephant flows in some caches. For example, some such embodiments may be used to implement one or each of EMC 212 and SMC 216. The elephant flows so identified are given a higher priority to be stored in the corresponding cache than any of the mice flows, which can advantageously increase the overall hit ratio for that cache.

The following notation is used below in the description of some example embodiments:

R denotes a line rate for network device 100 (FIG. 1).

$r_i$ denotes the effective rate corresponding to the i-th flow. The rates R and $r_i$ are related through Eq. (1):

$$R = \sum_{i=1}^{n} r_i \quad (1)$$

where n is the total number of flows.

B denotes the set of elephant flows, wherein each flow has the corresponding rate $r_i \geq b$, where b is an applicable threshold value. In mathematical terms:

$$B = \{i : r_i \geq b\} \quad (2)$$

k denotes the number of elephant flows.

m denotes the number of entries (e.g., table lines) in the cache.

In an example embodiment, each flow is hashed into the cache using a uniform hash function. According to the above notation, each elephant flow on an incoming line (e.g., one of ingress links $26_1$-$26_N$, FIG. 1) has a fractional rate that is greater than b/R. Under uniform hashing, the estimated amount of traffic reaching a particular table line in the cache is R/m. The probability that any arrival belongs to the i-th flow can thus be estimated as $r_i/R$ and is typically independent of the other arrivals. The probability that any particular elephant flow arrives in the cache is greater than p, where the probability p is given by Eq. (3):

$$p = \frac{mb}{R} \quad (3)$$

The probability $P_c$ of elephant-flow collision in a given cache table line, i.e., the probability that two or more elephant flows hash into the same cache table line, can be estimated using Eq. (4):

$$P_c = 1 - (1+\rho) \cdot \exp(-\rho) \quad (4)$$

where $\rho = k/m$. In an example embodiment, the relevant parameters may be selected such that the probability $P_c$ is relatively small.

Figure 3:
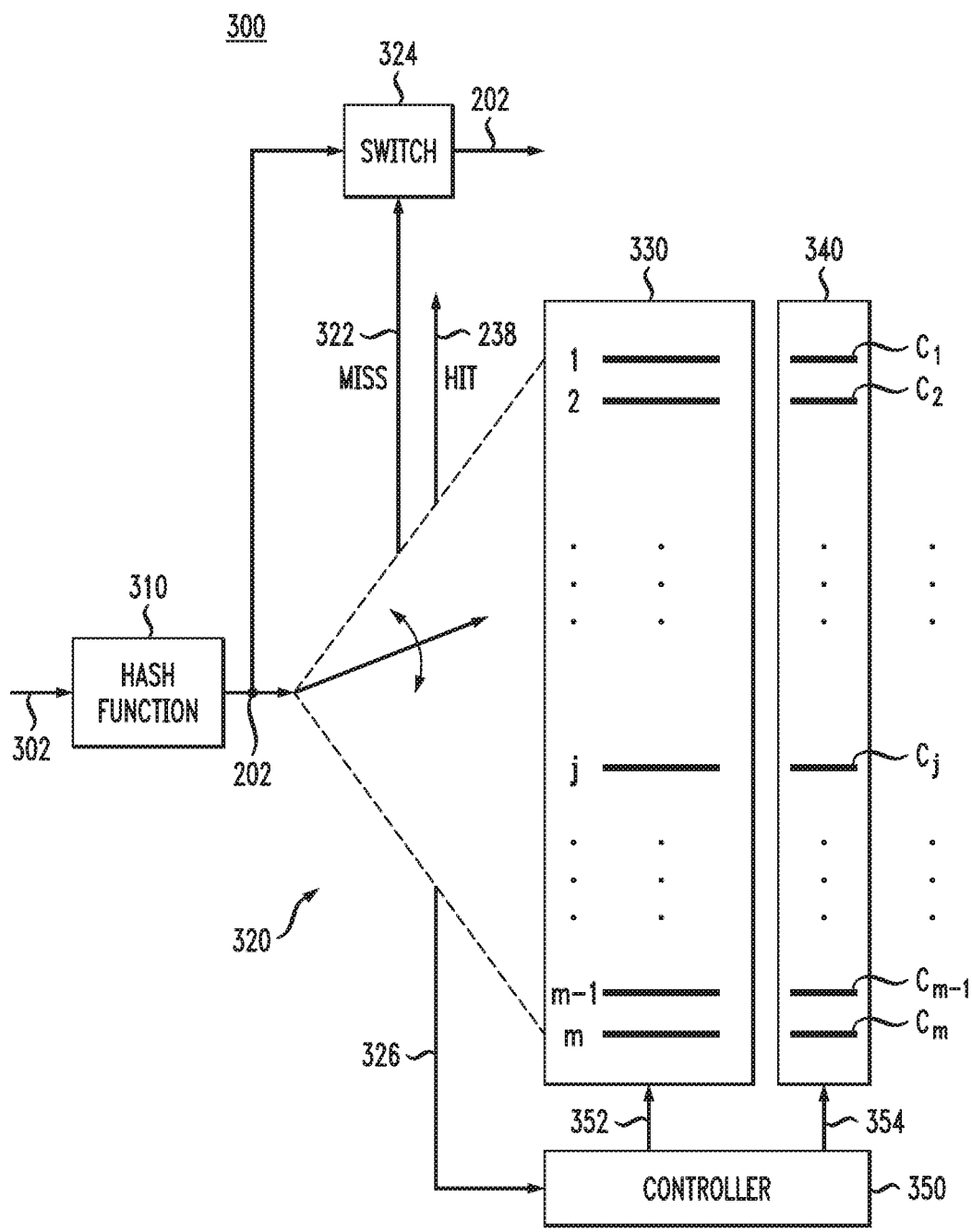
FIG. 3 shows a block diagram of a digital circuit that can be used to implement a portion of the network device of FIG. 1 according to an embodiment.

FIG. 3 shows a block diagram of a digital circuit 300 that can be used to implement a portion of network device 100 according to an embodiment. Circuit 300 comprises a flow cache 330. In different embodiments, flow cache 330 can be used to implement, e.g., EMC 212 or SMC 216 (also see FIG. 2).

In an example embodiment, flow cache 330 has a hash table having m lines (entries), as indicated in FIG. 3. A cache controller 350 is configured to load in and, if necessary, replace some or all of the entries by way of a control signal 352 and based on the applicable cache-entry replacement policy. Example embodiments of such policy are described below, e.g., in reference to FIGS. 4-6.

Circuit 300 further comprises a hash-function module 310, which can be a part of processing path 54 (FIG. 1). In operation, hash-function module 310 may receive a copy 302 of the packet header (or a relevant portion thereof), e.g., the packet header of a packet 52 buffered in forwarding component 42 (also see FIG. 1). Hash-function module 310 applies the operative hash function to the copy 302 to generate a corresponding lookup request 202 (also see FIG. 2). In response to the lookup request 202, a lookup circuit 320 searches the contents of flow cache 330. If there is a cache hit, then lookup circuit 320 fetches the corresponding flow pointer 238 from cache 330 and directs said flow pointer to action retrieval module 240 (also see FIG. 2). If there is a cache miss, then lookup circuit 320 generates a control signal 322 that configures a switch 324 to direct the lookup request 202 to the next cache tier or sub-tier. Lookup circuit 320 also generates a control signal 326 that communicate the search result (i.e., hit or miss) to cache controller 350.

Cache controller 350 is further configured to maintain a counter bank 340 having m individual counters $C_1$-$C_m$, each associated with the corresponding one of the m entries of flow cache 330. In operation, cache controller 350 uses a control signal 354 to update the individual counters $C_j$ (where j=1, . . . , m) of counter bank 340 in response to control signal 326 received from lookup circuit 320. In an example embodiment, the values of the individual counters $C_1$-$C_m$ can be non-negative integers (i.e., can be zero or positive).

Figures 4, 5:
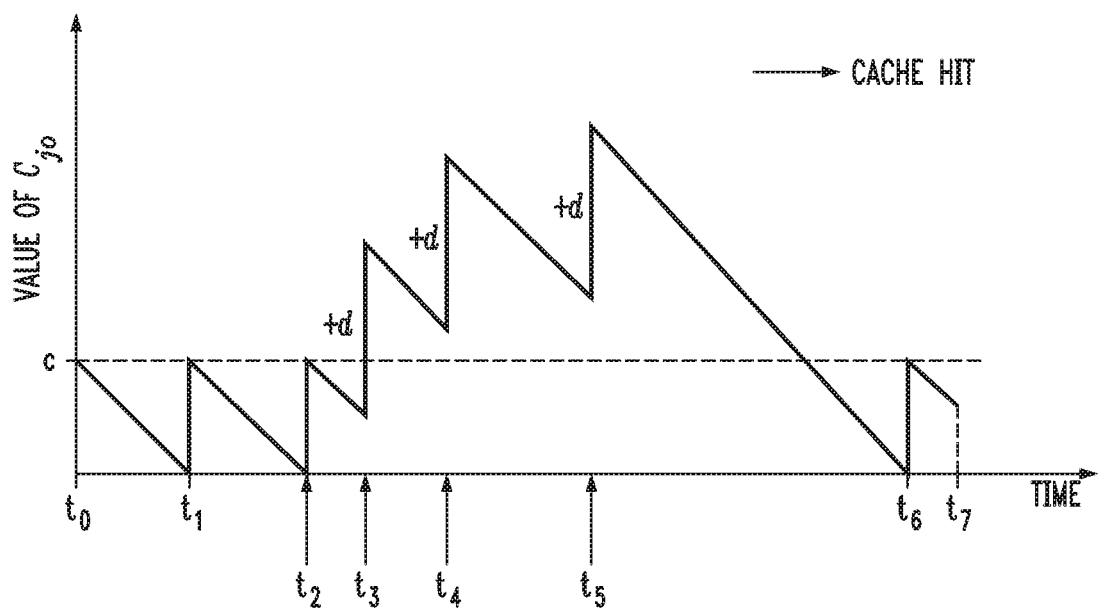
FIG. 4 shows a pseudocode that can be used to program the digital circuit of FIG. 3 according to an embodiment.
FIG. 5 graphically shows an example behavior of one of the counters in the digital circuit of FIG. 3 according to an embodiment.

FIG. 4 shows a pseudocode 400 that can be used to program cache controller 350 according to an embodiment.

Pseudocode 400 comprises conditional instructions 410 and 420. Conditional instruction 410 comprises conditional sub-instructions 412 and 414. Instruction 410 is executed if control signal 326 indicates a cache miss for the j-th cache line. If control signal 326 indicates a cache hit for the j-th cache line, then instruction 420 is executed for the corresponding cache entry.

In case of a cache miss for the j-th cache line, the counter $C_j$ is updated in accordance with conditional sub-instructions 412 and 414. More specifically, in case of a hash-value collision, the positive counter value $C_j$ is decremented by one. If the j-th counter value is zero, then the j-th cache entry may be replaced, in which case the corresponding counter value $C_j$ is set to c, where c is a fixed positive integer. If the hash value is not found in the cache, then a new entry for the missing hash value is created therein, and the corresponding counter value $C_j$ is set to c.

In case of a cache hit for the j-th cache line, the value of the corresponding counter $C_j$ is incremented by d in accordance with instruction 420, where d is a fixed positive integer.

The values of m, c, and d are configuration parameters that can vary from embodiment to embodiment. In particular, the values of m, c, and d can be selected to obtain a nearly optimal performance for a particular deployment of network device 100. The question of whether or not the performance is nearly optimal is typically resolved with respect to performance specifications and/or customer requirements. As such, different optimization procedures may be used for different deployments. In some embodiments, the values of c and d can be the same, i.e., c=d.

FIG. 5 graphically shows an example behavior of one of the counter values in counter bank 340. The corresponding counter is indicated in FIG. 5 as $C_{j0}$, i.e., $j=j_0$. The values of c and d are also graphically indicated in FIG. 5. In this example, c<d.

At time $t_0$, sub-instruction 414 is executed, and the counter value is set to c. The corresponding flow happens to be a mice flow. As a result, there are no hits for the $j_0$-th cache entry between time $t_0$ and time $t_1$, which causes sub-instruction 412 to be executed multiple times to incrementally run the counter value down to zero. At time $t_1$, sub-instruction 414 is executed again, and the counter value is again set to c. The corresponding new flow happens to be a mice flow again, and the same scenario is repeated between time $t_1$ and time $t_2$. At time $t_2$, sub-instruction 414 is executed again, and the counter value is again set to c. However, this time, the corresponding new flow happens to be an elephant flow. As a result, there are three hits on the $j_0$-th cache entry at times $t_3$, $t_4$, and $t_5$, respectively, which causes instruction 420 to be executed at each of those times, with each execution increasing the current counter value by d as indicated in FIG. 5. There are no new arriving packets for this elephant flow between time $t_5$ and time $t_6$, which causes sub-instruction 412 to be executed multiple times to incrementally run the counter value down to zero. At time $t_6$, sub-instruction 414 is executed, and the counter value is again set to c. There are no new hits on the $j_0$-th cache entry between time $t_6$ and time $t_7$, which causes sub-instruction 412 to incrementally run the counter value down. Depending on whether the corresponding flow is a mice flow or an elephant flow, the subsequent evolution of the counter value may be similar to the evolution between time $t_0$ and time $t_1$, or to the evolution between time $t_3$ and time $t_5$.

The results of FIG. 5 clearly indicate that cache controller 350 programmed based on pseudocode 400 causes cache dwell time for an elephant flow to be significantly longer than the cache dwell time for any of the mice flows. One can also observe that larger c and d values tend to increase the cache dwell time for the elephant flow. The value of c also influences how often mice flows are replaced in flow cache 330 by cache controller 350.

As already indicated above, the counter increment d and the counter reset value c have fixed values in the packet processing that is based on pseudocode 400 (FIG. 4). However, in some embodiments, it may be beneficial to program cache controller 350 such that some of the previously fixed parameters of the algorithm that implements the cache-entry replacement policy are allowed to vary, e.g., to better adapt the cache performance to the observed packet-traffic conditions. In particular, in some embodiments, it may be beneficial to enable cache controller 350 to dynamically change the counter increment d.

For example, when the counter increment d is too small, the counter value tends to drop to zero relatively frequently due to the relatively shorter period of time that will suffice for this outcome. On the other hand, when the counter increment d is too large, some relatively small flows may have a packet rate that is sufficient to keep the flow in the cache for a longer time, thereby preventing larger flows from the same flow set to be cached in with a greater resulting benefit to the overall packet processing. As such, embodiments in which the counter increment d can be dynamically changed may help in improving the performance.

Furthermore, when two or more elephant flows are hashed onto the same hash value (i.e., there is an elephant-flow collision, also see Eq. (4)), any of said elephant flows may occupy the corresponding cache entry for a relatively long time, thereby effectively blocking other elephant flows from the same flow set from being cached therein. Although the elephant flow with a higher rate tends to have a higher probability to be captured and stay in the cache, the packet processing based on pseudocode 400 does not generally guarantee that the cached elephant flow is the biggest elephant flow of the corresponding flow set. In contrast, embodiments in which the counter increment d can be dynamically changed can help to identify and cache in the biggest elephant flow(s) more effectively.

FIG. 6 shows a script 600 that can be used to program cache controller 350 according to an alternative embodiment. Note that, unlike pseudocode 400, script 600 can change the counter increment d, e.g., at lines 606 and 615 thereof. Script 600 can be executed at each new packet arrival. As a result, different respective values of d may be assigned to different counters $C_j$ of counter bank 340 at some particular times.

The following variables are used in script 600:
ARR denotes the flow to which the newly arrived packet belongs;
CACHE denotes the flow that is currently stored in the cache entry for which script 600 is being executed, e.g., illustratively corresponding to $j=j_0$;
SC is the current value of the counter $C_{j0}$ in counter bank 340 (also see FIG. 3);
ZC is the counter configured to count the number of instances at which the value of SC is zero;
GAP denotes the number of packets of other flows that have arrived after the last packet arrival for the flow CACHE.

In an example embodiment, counter bank 340 can be appropriately expanded to also host the counters that keep track of ZC and GAP for each of the cache entries.

Script 600 has five conditional instructions configured to realize at least the following objectives: (i) dynamically adjusting the counter increment d until its value becomes nearly optimal for catching and keeping in the cache the largest elephant flow corresponding to $j=j_0$ (see, e.g., line 615); and (ii) quickly replacing in the cache any elephant flow that has been idle for too long, e.g., went away completely or turned itself into a mice flow (see, e.g., lines 605-606).

Lines 601-602 of script 600 are executed when a cache hit occurs on the cache entry, i.e., when the flow ARR is the same as the flow CACHE. Line 619 has the end operator of the corresponding conditional instruction. In line 602, the value of GAP is set to zero, and the counter value SC is incremented by d. In the shown example, the maximum allowed value of SC is 4096. In an alternative embodiment, a different maximum allowed value of SC may similarly be specified. In some embodiments, the counter value SC may not have a specified upper limit.

Lines 603-618 provide processing instructions for the case of a cache miss for the cache entry, e.g., when the flow ARR is different from the flow CACHE.

Line 604 increments the GAP counter by one to add the received packet to the count of the previous hash-value collisions for this cache entry.

Lines 605-606 deal with the case of the flow CACHE being an elephant flow that has been idle for too long. The check of whether or not the flow CACHE is an elephant flow used herein relies on a comparison of the counter value SC with a first threshold value. In this example, the first threshold value is 4d, although other threshold values may alternatively be used. The flow CACHE is deemed to be an elephant flow if SC≥4d (see line 605). The check of whether or not the flow CACHE has been idle for too long relies on a comparison of the current value of the GAP counter with a second threshold value. In this example, the second threshold value is 4d, although other threshold values may alternatively be used. The flow CACHE is deemed to be idle for too long if GAP≥4d (see line 605). In some embodiments, the second threshold value may differ from the first threshold value.

If both of the inequalities of line 605 are true, then the cache entry is replaced, i.e., the flow CACHE is removed from the cache, and the flow ARR is saved in the cache in the freed space (see line 606). In addition, the counter value SC is reset to one, i.e., in this embodiment c=1 (also see FIG. 5). The counter increment d is also reset to one. In an alternative embodiment, other reset values (which may be the same or differ from one another) may similarly be used.

Lines 607-617 deal with cases in which at least one of the inequalities of line 605 is false. This means that either the flow CACHE is not an elephant flow or the flow CACHE was recently active.

Line 608 decrements the counter value SC by one. This reflects the fact that this portion of script 600 deals with a cache miss for the cache entry, as already mentioned above.

Lines 609-617 deal with situations in which the decremented SC value is zero.

In line 610, the value of SC is reset to one, i.e., c=1 as already indicated above in reference to line 606. Also, the counter ZC is incremented by one to count the SC zero detected at line 609.

Lines 611-613 give a small chance (with the probability of occurrence of about 1%, in this example) for replacing the cache entry, i.e., for removing the flow CACHE from the cache and saving therein the flow ARR.

Lines 614-616 are used to increase the counter increment d when its value is deemed to be too small. As already indicated above, small values of d may increase the frequency of cache-entry replacements, which may be detrimental to the overall cache performance. The determination of whether or not the value of d is too small is based on the comparison of the counter ZC with a third threshold value. In this example, the third threshold value is eight (see line 614). In other embodiments, other threshold values (i.e., different from eight) may similarly be used.

In line 615, the value of ZC is reset to zero, and the value of d is incremented by 1. In the shown example, the maximum allowed value of d is 256. In an alternative embodiment, a different maximum allowed value of d may similarly be used.

FIG. 7 illustrates example performance improvements for network device 100 (FIG. 1) according to an embodiment. More specifically, the table shown in FIG. 7 illustrates relative performance for two OVS implementations, with one being a conventional implementation and the other employing SMC 216 (see FIG. 2) implemented using circuit 300 (FIG. 3) as described above.

More specifically, the shown experimental results correspond to a scheme in which the SMC is configured to perform four-way caching using one hash function. In other words, the approximately one million SMC table entries are divided into 256 k "buckets," with four entries per bucket. Each flow is hashed into one of the buckets and can occupy any entry in the bucket. In the considered scenario, there are 8 k wildcard-based packet-forwarding rules in the switch, using 16 different wildcards. As a result, there are 8 k rules in the Datapath Classifier 220 during runtime, evenly spread across 16 sub-tables. There are one million "big flows" and eight million "small flows." The total traffic volume ratio of big flows to small flows ranges from 1:1 to 8:1.

From FIG. 7, one can observe that in all tested scenarios, the use of circuit 300 can improve both the cache-hit ratio by up to about 60% and the overall throughput by about 35%. Note however that a larger cache-hit-ratio increase does not always translate into a correspondingly larger throughput increase. In general, when the cache-hit ratio is in its higher range (e.g., closer to 100%), an increase in the cache-hit ratio can lead to a more significant improvement in the overall throughput than in the cases in which the cache-hit ratio is in its lower range.

As already indicated above, some embodiments may be used to implement OVS's. Such embodiments may benefit from the use of at least some of the below-described features. Based on the specific intended application, a person of ordinary skill in the art will understand how to incorporate some or all of such features to arrive at an OVS design best suited for the intended application.

With respect to an EMC, such as the EMC 212 (FIG. 2), we note that such an EMC is typically the fastest datapath flow cache in the OVS. Each EMC entry typically stores both the entire flow key and a hash value computed based on the flow key. In legacy OVS's, the flow key is contained in the data structure named mini_flow. This data structure also includes other pertinent packet-header information and metadata. When a packet arrives, its header information is extracted and used to hash into one of the EMC entries. The packet can be matched with an EMC flow entry by comparing both the hash value and mini_flow key. If a cache miss occurs, then the packet is directed to the next-stage cache for further lookup therein. A missing flow may be inserted into the cache for quick later access. Such flow insertion typically comprises copying the flow key, which usually contains a few hundred bytes. Probabilistic (i.e., not at every miss) insertion is thus used to limit the cumulative insertion overhead.

According to an example embodiment, EMC 212 may include counter bank 340 (see FIG. 3). To reduce memory usage, it may be beneficial to avoid new memory allocations therefor, e.g., by reusing existing data structures. For example, the legacy OVS code has a four-byte variable named len within the flow key. This variable contains the length of the mini_flow data structure where the packet-header information is stored. Since the size of mini_flow is only a few hundred bytes, one can reduce len to two bytes, and use the remaining two bytes to store the counter values of counters $C_1$-$C_m$.

The probabilistic insertion in the legacy-OVS EMC implementations invokes a random-number generator and, as such, incurs the corresponding overhead. However, some embodiments may be configured to take advantage of the respective hash value stored in each EMC entry. More specifically, based on the observation that two putative flows hashing onto the same hash value are very likely to be the same, one can replace the legacy probabilistic insertion by the following modified insertion procedure: (1) when a flow is inserted for the first time, circuit 300 may operate to copy only the four-byte hash value into the cache entry, but not insert the mini_flow; and (2) circuit 300 may further operate to fully insert the flow into the cache only if and when that same flow comes up again, in which case the corresponding hash value will match the already existing hash value in the partial cache entry inserted at step (1). In this manner, small flows can be filtered out quite naturally from imposing disproportionate resource consumption because packets belonging to the same small flow typically come again very rarely during the average cache-entry dwell time. It should also be noted that, with a small probability, different small flows may have the same hash value (i.e., a small-flow collision may occur in the cache entry), which may cause the later of such flows to become fully inserted into the cache. However, this outcome does not affect the overall correctness of the flow processing. In an example embodiment, one can use the highest bit of the corresponding counter $C_j$ as a flag for indicating the completion of step (1) of the modified insertion procedure outlined above.

The use of script 600 relies on additional information stored in the cache entries, as described in this specification. In an example embodiment, sixty-four bytes of data may be added to each EMC flow entry, e.g., to hold the values of SC, d, ZC, and GAP used by script 600. Although this addition represents an extra memory allocation, it nevertheless corresponds to a relatively small fraction of the full EMC-entry size. In some embodiments, the additional memory allocation may be kept down, e.g., by using at least some of the counters $C_j$, ZC, and/or GAP of smaller sizes.

SMC 216 can be used either alone or together with EMC 212 in the cache tier 210 (see FIG. 2). Unlike EMC 212, where flows are matched based on the exact packet header fields, SMC 216 can be used to match flows based on a 16-bit signature computed from the packet header. As a result, each SMC flow entry is reduced in size from a few hundred bytes to about four bytes, e.g., including two bytes for the flow signature and another two bytes for its index in the flow table. As a result, SMC 216 can be configured to hold, e.g., a million flows, thereby providing a much higher capacity than EMC 212. However, since two different flows may potentially have the same signature, a matched flow in SMC 216 still needs to be verified by retrieving the actual flow from the full flow table using the cached index and performing wildcard-based flow matching. As a consequence, when there is a cache hit, the overall lookup time for SMC 216 may typically be longer than that for EMC 212.

Although the use of SMC 216 can significantly increase the number of flows that can be cached, its performance may still be adversely affected when there is a long tail of small flows in the network. The latter situation may occur relatively often, e.g., in an Internet of Things (IoT) network where millions of devices may sporadically send small amounts of data. Since SMC-entry size is only four bytes, an embodiment of pseudocode 400 may be better suited for IoT applications than script 600. For example, in one embodiment, four selected bits from the signature field of each cache entry may be configured to store the value of the counter $C_j$. Although this memory allocation may increase the frequency of signature collisions, our performance-evaluation results indicate that the higher cache-hit ratio brought about by the use of counter bank 340 typically overrides the detrimental effect on the overall performance of such additional signature collisions. We also note that, because each cache entry in SMC 216 is relatively small, the SMC-insertion overhead is small as well. As a consequence, the modified insertion procedure described above in reference to EMC 212 may not be warranted for SMC 216.

Although, as already mentioned above, an embodiment of pseudocode 400 can cause the corresponding cache to capture any of the elephant flows whose rate is above the corresponding specified threshold, such an embodiment may not always capture the largest elephant flow when multiple elephant flows hash onto the same cache entry. However, given the typically large number of entries in SMC 216, the probability for multiple elephant flows to share the same cache entry is relatively small. Even when a smaller one of such elephant flows dwells in SMC 216 instead of the largest one, the corresponding performance improvement with respect to the legacy OVS can still be very substantial.

We finally note that, although the use of script 600 or a similar script typically results in a performance improvement, said improvement is achieved at the cost of additional memory resources and/or circuit complexity. As such, the decision on whether or not script 600 (or a similar script) needs to be invoked in any particular deployment may be best based on the corresponding cost-benefit analysis. For example, when the traffic pattern is known, a configuration using an embodiment of pseudocode 400 be more preferable due to its smaller memory consumption. Such an embodiment may also be more preferable in cases for which the memory requirements are rather stringent.

According to an example embodiment disclosed above, e.g., in the summary section and/or in reference to any one or any combination of some or all of FIGS. 1-7, provided is an apparatus comprising: a network device (e.g., 100, FIG. 1) that comprises packet-processing circuitry (e.g., 34, FIG. 1) configured to apply sets of flow-specific actions to received packets (e.g., 52, FIG. 1) based on identification of a respective flow for each of the received packets; wherein the packet-processing circuitry comprises a first flow cache (e.g., 330, FIG. 3; part of 46, FIGS. 1, 2) and an electronic cache controller (e.g., 37, FIG. 1; 350, FIG. 3), the first flow cache being configured to aid in the identification by storing therein a plurality of entries, each of the entries pointing to a respective one of the sets, the electronic cache controller being configured to replace (e.g., at 414, FIG. 4) at least some of the entries based on corresponding first updatable counters (e.g., $C_1$-$C_m$, FIG. 3); and wherein, in response to a cache hit, the packet-processing circuitry is configured to increment the first updatable counter corresponding to a hit entry (e.g., at 420, FIG. 4).

In some embodiments of the above apparatus, in response to a cache miss, the packet-processing circuitry is configured to: decrement the first updatable counter (e.g., at 412, FIG. 4) for a corresponding existing one of the entries; or add a new entry to the plurality of entries when the cache miss is due to an absence of a corresponding entry in the plurality of entries.

In some embodiments of any of the above apparatus, the electronic cache controller is configured to determine whether or not to replace a stored entry whose corresponding first updatable counter is decremented to zero based on a fixed nonzero probability of replacement (e.g., at 608-609, 611-612, FIG. 6).

In some embodiments of any of the above apparatus, the packet-processing circuitry is configured to reset to a fixed value (e.g., c, FIG. 5) the first updatable counter corresponding to a replaced entry.

In some embodiments of any of the above apparatus, a value of the increment (e.g., d, FIG. 5) is different from the fixed value (i.e., d≠c).

In some embodiments of any of the above apparatus, a value of the increment (e.g., d, FIG. 5) and the fixed value are identical (i.e., d=c).

In some embodiments of any of the above apparatus, a value of the increment (e.g., d, FIG. 5) is variable (e.g., at 615, FIG. 6).

In some embodiments of any of the above apparatus, the packet-processing circuitry is configured to change (e.g., at 615, FIG. 6) a value of the increment (e.g., d, FIG. 5) for a selected one of the entries based on a second updatable counter (e.g., ZC, FIG. 6) corresponding to said selected entry, the second updatable counter counting a number of instances at which the first updatable counter corresponding to said selected entry is decremented to zero (e.g., at 608-610, FIG. 6).

In some embodiments of any of the above apparatus, the electronic cache controller is configured to replace an existing one of the entries (e.g., at 606, FIG. 6) if a value of the first updatable counter corresponding to said existing one of the entries is greater than a first threshold value (e.g., SC≥4d, at 605, FIG. 6) and if a number of packets of other flows arrived after a last hit on said existing one of the entries is greater than a second threshold value (e.g., GAP≥4d, at 605, FIG. 6).

In some embodiments of any of the above apparatus, the first and second threshold values are identical.

In some embodiments of any of the above apparatus, the first and second threshold values are different.

In some embodiments of any of the above apparatus, the packet-processing circuitry is configured to use different respective values of the increment for at least two different hit entries.

In some embodiments of any of the above apparatus, the packet-processing circuitry is configured to change (e.g., at 606, FIG. 6) a value of the increment (e.g., d, FIG. 5) for a replaced entry.

In some embodiments of any of the above apparatus, the packet-processing circuitry comprises a plurality of flow caches (e.g., 46, FIG. 2) configured to be accessed in a defined sequence in response to one or more cache misses, said plurality including the first flow cache.

In some embodiments of any of the above apparatus, the plurality of flow caches includes a second flow cache (e.g., 216, FIG. 2) that follows the first flow cache (e.g., 212, FIG. 2) in the defined sequence.

In some embodiments of any of the above apparatus, the plurality of flow caches includes a second flow cache (e.g., 212, FIG. 2) that precedes the first flow cache (e.g., 216, FIG. 2) in the defined sequence.

In some embodiments of any of the above apparatus, the plurality of flow caches includes a third flow cache (e.g., 220, FIG. 2) that follows the first flow cache in the defined sequence.

In some embodiments of any of the above apparatus, the network device comprises an Open Virtual Switch that includes the packet-processing circuitry.

In some embodiments of any of the above apparatus, at least some of the sets have a single respective action.

In some embodiments of any of the above apparatus, the packet-processing circuitry is configured to generate a hash value by applying a hash function to a packet header (e.g., using 310, FIG. 3); and wherein the plurality of entries stored in the first flow cache are indexed therein using a corresponding plurality of different hash values generated by the packet-processing circuitry.

In some embodiments of any of the above apparatus, the packet-processing circuitry is configured to identify the cache hit by: (A) finding a matching one of the entries in the first flow cache using the hash value as an index thereto; and (B) matching a flow key in said matching one of the entries to the packet header or matching a flow signature in said matching one of the entries to a signature of the packet header.

According to another example embodiment disclosed above, e.g., in the summary section and/or in reference to any one or any combination of some or all of FIGS. 1-7, provided is an apparatus comprising: at least one processor (e.g., 12, FIG. 1); and at least one memory (e.g., 43, FIG. 1) including program code (e.g., 400, FIG. 4; 600, FIG. 6); and wherein the at least one memory and the program code are configured to, with the at least one processor, cause the apparatus at least to: (A) apply sets of flow-specific actions to received packets (e.g., 52, FIG. 1) based on identification of a respective flow for each of the received packets; (B) perform said identification using a flow cache (e.g., 330, FIG. 3; part of 46, FIGS. 1, 2) configured to store therein a plurality of entries, each of the entries pointing to a respective one of the sets; (C) replace (e.g., at 414, FIG. 4) at least some of the entries based on corresponding updatable counters (e.g., $C_1$-$C_m$, FIG. 3); and (D) in response to a cache hit, increment the updatable counter corresponding to a hit entry (e.g., at 420, FIG. 4).

According to yet another example embodiment disclosed above, e.g., in the summary section and/or in reference to any one or any combination of some or all of FIGS. 1-7, provided is a non-transitory machine-readable medium, having encoded thereon program code (e.g., 400, FIG. 4; 600, FIG. 6), wherein, when the program code is executed by a machine (e.g., 100, FIG. 1), the machine implements a method comprising the steps of: (A) applying sets of flow-specific actions to received packets (e.g., 52, FIG. 1) based on identification of a respective flow for each of the received packets; (B) performing said identification using a flow cache (e.g., 330, FIG. 3; part of 46, FIGS. 1, 2) configured to store therein a plurality of entries, each of the entries pointing to a respective one of the sets; (C) replacing (e.g., at 414, FIG. 4) at least some of the entries based on corresponding updatable counters (e.g., $C_1$-$C_m$, FIG. 3); and (D) in response to a cache hit, incrementing the updatable counter corresponding to a hit entry (e.g., at 420, FIG. 4).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of methods and apparatuses for practicing those methods. Some embodiments can also be embodied in the form of program code recorded in tangible media, such as magnetic recording media, optical recording media, solid state memory, diskettes, CD-ROMs, hard drives, thumb drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific digital circuits.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processor" and/or "controller," may be provided through the use of dedicated hardware as well as hardware capable of executing software in association with appropriate hardware. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising a network device that comprises packet-processing circuitry configured to apply sets of flow-specific actions to received packets based on identification of a respective flow for each of the received packets;
wherein the packet-processing circuitry comprises a first flow cache and an electronic cache controller, the first flow cache being configured to aid in the identification by storing therein a plurality of entries, each of the entries pointing to a respective one of the sets, the electronic cache controller being configured to replace at least some of the entries based on corresponding first updatable counters;
wherein, in response to a cache hit, the packet-processing circuitry is configured to increment the first updatable counter corresponding to a hit entry by an increment value greater than one.

2. The apparatus of claim 1, wherein, in response to a cache miss, the packet-processing circuitry is configured to:
decrement the first updatable counter for a corresponding existing one of the entries; or
add a new entry to the plurality of entries when the cache miss is due to an absence of a corresponding entry in the plurality of entries.

3. The apparatus of claim 1, wherein the electronic cache controller is configured to determine whether or not to replace a stored entry whose corresponding first updatable counter is decremented to zero based on a fixed nonzero probability of replacement.

4. The apparatus of claim 1, wherein the packet-processing circuitry is configured to reset to a fixed value the first updatable counter corresponding to a replaced entry.

5. The apparatus of claim 1, wherein a value of the increment is variable.

6. The apparatus of claim 1, wherein the packet-processing circuitry is configured to change a value of the increment for a replaced entry.

7. The apparatus of claim 1, wherein a plurality of flow caches includes the first flow cache and a second flow cache that follows the first flow cache in a defined sequence.

8. The apparatus of claim 1, wherein a of flow caches includes the first flow cache and a second flow cache that precedes the first flow cache in a defined sequence.

9. The apparatus of claim 8, wherein the plurality of flow caches includes a third flow cache that follows the first flow cache in the defined sequence.

10. The apparatus of claim 1, wherein the network device comprises an Open Virtual Switch that includes the packet-processing circuitry.

11. The apparatus of claim 1, wherein at least some of the sets have a single respective action.

12. An apparatus comprising:
at least one processor; and
at least one memory including program code; and
wherein the at least one memory and the program code are configured to, with e at least one processor, cause the apparatus at least to:
apply sets of flow-specific actions to received packets based on identification of a respective flow for each of the received packets;
perform said identification using a flow cache configured to store therein a plurality of entries, each of the entries pointing to a respective one of the sets;
replace at least some of the entries based on corresponding updatable counters;
in response to a cache hit, increment the updatable counter corresponding to a hit entry by an increment value greater than one.

13. A non-transitory machine-readable medium, having encoded thereon program code, wherein, when the program code is executed by a machine, the machine implements a method comprising:
applying sets of flow-specific actions to received packets based on identification of a respective flow for each of the received packets;
performing said identification using a flow cache configured to store therein a plurality of entries, each of the entries pointing to a respective one of the sets;
replacing at least some of the entries based on corresponding updatable counters;
in response to a cache hit, incrementing the updatable counter corresponding to a hit entry by an increment value greater than one.

14. An apparatus comprising a network device that comprises packet-processing circuitry configured to apply sets of flow-specific actions to received packets based on identification of a respective flow for each of the received packets;
wherein the packet-processing circuitry comprises a first flow cache and an electronic cache controller, the first flow cache being configured to aid in the identification by storing therein a plurality of entries, each of the entries pointing to a respective one of the sets, the electronic cache controller being configured to replace at least some of the entries based on corresponding first updatable counters;
wherein, in response to a cache hit, the packet-processing circuitry is configured to increment the first updatable counter corresponding to a hit entry; and
wherein the packet-processing circuitry is configured to change a value of the increment for a selected one of the entries based on a second updatable counter corresponding to said selected entry, the second updatable counter counting a number of instances at which the first updatable counter corresponding to said selected entry is decremented to zero.

15. An apparatus comprising a network device that comprises packet-processing circuitry configured to apply sets of flow-specific actions to received packets based on identification of a respective flow for each of the received packets;
  wherein the packet-processing circuitry comprises a first flow cache and an electronic cache controller, the first flow cache being configured to aid in the identification by storing therein a plurality of entries, each of the entries pointing to a respective one of the sets, the electronic cache controller being configured to replace at least some of the entries based on corresponding first updatable counters;
  wherein, in response to a cache hit, the packet-processing circuitry is configured to increment the first updatable counter corresponding to a hit entry; and
  wherein the electronic cache controller is configured to replace an existing one of the entries if a value of the first updatable counter corresponding to said existing one of the entries is greater than a first threshold value and if a number of packets of other flows arrived after a last hit on said existing one of the entries is greater than a second threshold value.

16. The apparatus of claim 15, wherein the first and second threshold values are identical.

17. The apparatus of claim 15, wherein the first and second threshold values are different.

18. The apparatus of claim 1,
  wherein the packet-processing circuitry is configured to generate a hash value by applying a hash function to a packet header; and
  wherein the plurality of entries stored in the first flow cache are indexed therein using a corresponding plurality of different hash values generated by the packet-processing circuitry.

19. The apparatus of claim 18, wherein the packet-processing circuitry is configured to identify the cache hit by:
  finding a matching one of the entries in the first flow cache using the hash value as an index thereto; and
  matching a flow key in said matching one of the entries to the packet header or matching a flow signature in said matching one of the entries to a signature of the packet header.

20. The apparatus of claim 1, wherein the packet-processing circuitry is configured to change a value of the increment for a selected one of the entries based on a second updatable counter corresponding to said selected entry, the second updatable counter counting a number of instances at which the first updatable counter corresponding to said selected entry is decremented to zero.

21. The apparatus of claim 1, wherein the electronic cache controller is configured to replace an existing one of the entries if a value of the first updatable counter corresponding to said existing one of the entries is treater than a first threshold value and if a number of packets of other flows arrived after a last hit on said existing one of the entries is greater than a second threshold value.

22. The apparatus of claim 1, wherein the increment has a fixed value greater than one.

23. The apparatus of claim 1, wherein at least two different cache lines in the first flow cache have different increment values.

24. The apparatus of claim 6, wherein the increment for the replaced entry is set to one.

25. The apparatus of claim 12, wherein the value of the increment is variable.

26. The apparatus of claim 13, wherein the value of the increment is variable.

* * * * *

UNITED STATES PATENT AND TRADEMARK OFFICE
CERTIFICATE OF CORRECTION

PATENT NO. : 11,516,133 B2  
APPLICATION NO. : 16/920993  
DATED : November 29, 2022  
INVENTOR(S) : Hyunseok Chang et al.

Page 1 of 1

It is certified that error appears in the above-identified patent and that said Letters Patent is hereby corrected as shown below:

In the Claims

Column 20, Line 1, In Claim 8, replace "wherein a of flow caches" with ---wherein a plurality of flow caches---.

Column 20, Line 16, In Claim 12, replace "with e at least one processor," with ---with the at least one processor,---.

Column 22, Lines 18-19, In Claim 21, replace "one of the entries is treater than a first threshold value" with ---one of the entries is greater than a first threshold value---.

Signed and Sealed this  
Sixth Day of June, 2023

Katherine Kelly Vidal  
*Director of the United States Patent and Trademark Office*